United States Patent [19]

Kolb et al.

[11] Patent Number: 4,625,317
[45] Date of Patent: Nov. 25, 1986

[54] INTERNAL MIRROR LASER

[75] Inventors: William P. Kolb, Redwood City; Dale E. Crane, Sunnyvale, both of Calif.

[73] Assignee: Cyonics, Ltd., Sunnyvale, Calif.

[21] Appl. No.: 599,298

[22] Filed: Apr. 12, 1984

[51] Int. Cl.[4] .............................................. H01S 3/097
[52] U.S. Cl. ...................................... 372/88; 372/34; 372/61; 372/87; 372/107
[58] Field of Search ........................ 372/34, 87, 88, 33, 372/61, 64, 72, 85, 107

[56] References Cited

U.S. PATENT DOCUMENTS 3,763,442 10/1973 McMahan ............................. 372/34
4,081,762 3/1978 Golser et al. ......................... 372/88
4,477,907 10/1984 McMahan ............................. 372/64

OTHER PUBLICATIONS

Matsuda, et al., "Air-Cooled Argon-Ion Laser", 11/79, pp. 5-9.
Hodges, "Internal Mirror Argon Laser", Proceedings of the 1983 Lasers in Graphics Electronic Publishing in the 80's Conference, vol. I, pp. 122-130, 12/23/83.
Spectra Physics, "A Blue HE-NE?", Lasers & Applications, vol. 2, No. 8, Aug. 1983.
Mal'tsev; "Side Cathode for Powerful Argon Laser" Instrum. & Exp. Tech. (USA), vol. 22, No. 4, pt. 2, (Jul.-Aug. 79), Feb '80.

Primary Examiner—Léon Scott, Jr.
Attorney, Agent, or Firm—Townsend and Townsend

[57] ABSTRACT

A thermal structure and cooling system for an argon-ion laser that is virtually free of thermal asymmetries includes a laser cathode having a housing constructed of a material of high thermal conductivity and relatively low thermal expansion in conjunction with a cooling structure configuration which readily and uniformly dissipates heat. In a specific embodiment the support structure is fabricated of copper material of at least a minimal thickness and the cooling fins are disposed in one and two stages of radial fins at specified regions along the support structure forming the discharge tube and enclosed by a tubular thermally conductive band.

8 Claims, 5 Drawing Figures

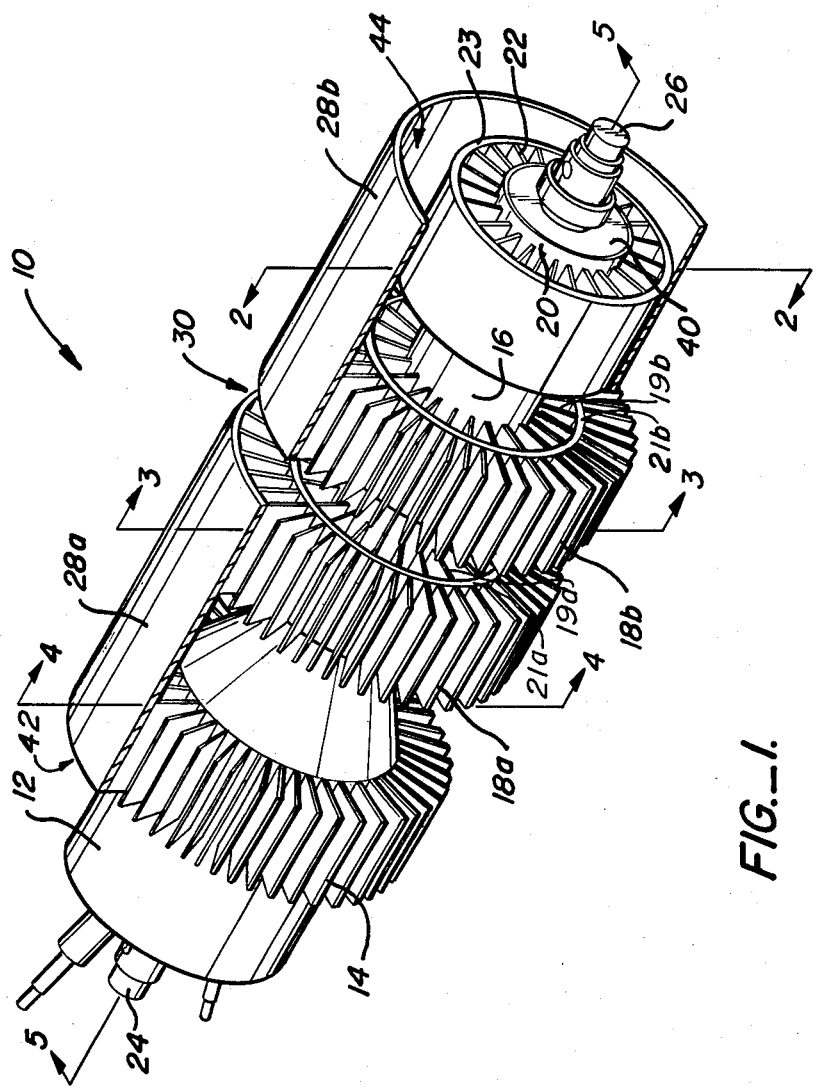
FIG._1.

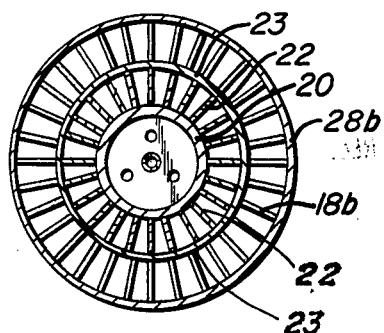
FIG._2.
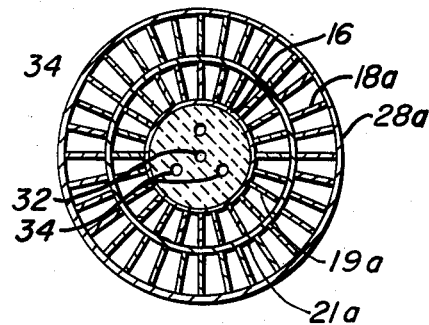
FIG._3.
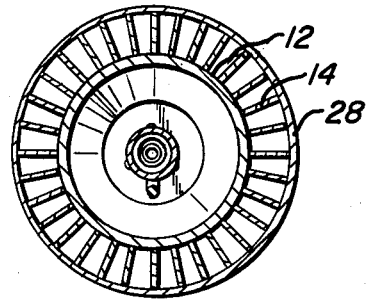
FIG._4.
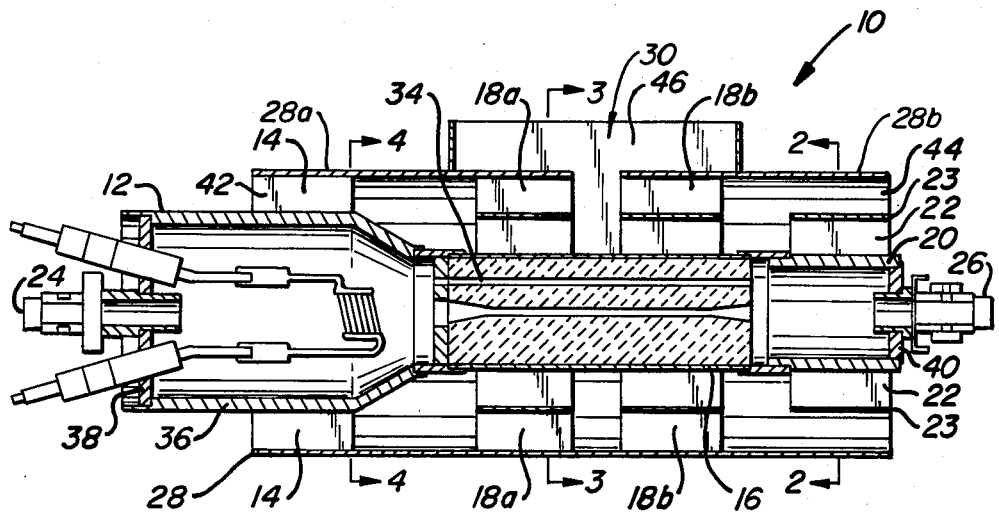
FIG._5.

INTERNAL MIRROR LASER

BACKGROUND OF THE INVENTION

This invention relates to internal mirror gas lasers, and more particularly to an improved design of such lasers providing superior optical and structural characteristics.

Internal mirror gas lasers employ an envelope forming a gas discharge tube as a resonator support structure where laser mirrors are sealably mounted directly to the ends of the tube. The internal mirror arrangement has several advantages, including simplicity in operation and maintenance.

Lasers, particularly continuous discharge argon-ion lasers, are relatively energy inefficient in operation, resulting in the generation of significant waste heat which must be dissipated in the laser body. Argon-ion lasers operating in a continuous mode may generate waste heat on the order of 50–200 watts per centimeter of bore length (as compared to 0.4 watts per centimeter of bore length for a helium-neon laser), along the positive column or main bore of the discharge tube. This can cause differential heating of the laser components, warping and structural misalignment of the laser affecting the optical characteristics of the laser output beam. Accordingly, many argon-ion lasers utilize a resonator support structure that is thermally and mechanically isolated from the discharge tube to prevent thermal and mechanical misalignment of the resonator during operation. In external mirror configurations the laser mirrors are attached to each end of the resonator support structure and are generally adjustable to bring the optical axis of the resonator into alignment with the longitudinal axis of the bore of the discharge tube. However, external mirror structures are by comparison larger, less rugged and more complex than internal mirror structures. There is therefore a need for compact, rugged and simple lasers which maintain mirror alignment in various thermal and mechanical environments.

Various techniques have been suggested to improve heat dissipation efficiency of continuous mode lasers. For example, convection cooling is common. Forced air or flowing water cooling is generally applied to the envelope to dissipate the heat generated in the discharge tube. In the past, radially extending cooling fins have been attached to the envelope containing the main bore to increase the efficiency of heat dissipation.

Argon-ion internal mirror lasers are known which employ cooling fins in general. For example, the Toshiba Review in an article by Matsuda et al. in Nov–Dec 1979 describes an Air-Cooled Argon-Ion Laser which is of internal mirror construction having a beryllia ceramic as the capillary material in the plasma tube and rings of radially disposed cooling fins mounted to the plasma tube. The cathode housing is constructed of quartz and does not employ cooling fins. The array appears to be constructed by stacking rings on the plasma tube. McMahan, U.S. Pat. No. 3,763,442 illustrates an external mirror design in which fins are constructed by fan folding a foil sheet of thermally conductive pliant material such as copper which surrounds a beryllium oxide plasma tube. The fan fold construction permits the fin structure to adjust to the differential movement of the ceramic plasma tube during thermal cycling without damage to the structure. The cathode housing is of Kovar and does not employ cooling fins. Cooling fins of such a design as taught by McMahan or Matsuda have a number of disadvantages. First, such fin structures are difficult and expensive to fabricate with precision. Second, the structure fails to provide a suitable cooling gradient to minimize the mechanical effects associated with thermal expansion and contraction of the internal mirror laser structure. There is considerable room for improvement to achieve the goal of adequate heat dissipation and minimal thermally-induced movement of the plasma tube.

Other internal mirror lasers are known, such as those manufactured by Spectra-Physics of Mountain View, Calif. The Spectra-Physics lasers employ a cathode housing constructed of alumina which does not employ cooling fins. Heretofore the problem of controlling and dissipating heat in the cathode housing of an internal mirror laser has not been completely recognized or fully addressed.

SUMMARY OF THE INVENTION

A thermal structure and cooling system for an argon-ion laser that is virtually free of thermal asymmetries includes a laser cathode having a housing constructed of a material of high thermal conductivity and relatively low thermal expansion in conjunction with a cooling structure configuration which readily and uniformly dissipates heat.

In a specific embodiment the support structure is fabricated of copper material of at least a minimal thickness and the cooling fins are disposed in one and two stages of radial fins at specified regions along the support structure forming the discharge tube and enclosed by a tubular thermally conductive band. The support structure and fin structure are fabricated of annealed copper. The wall thickness of the support structure is typically at least 0.1 inches and preferably greater than 0.125 inches. This thickness has been found to be adequate to compensate for the inherent low yield strength of annealed copper and to provide low thermal impedance to dissipate waste heat quickly to the outer margin of the structure. The cooling fins further enhance heat dissipation by increasing the low thermal impedance surface area.

Furthermore, it has been discovered that copper plates on the ends of the cathode and anode envelope greatly improve the thermal stability of the resonator support structure.

To further enhance these improved thermal properties, the cathode and anode housings are provided with radially extending cooling fins constructed of copper. The anode and cathode housings as well as the laser bore are provided with copper fins brazed directly thereon. Cool air is forcibly circulated symmetrically along the length of the laser either from one end to the other or from each end towards the center where it is exhausted. This results in a significant improvement in the thermal symmetry of the air-cooled laser design with regard to mirror alignment.

The invention will be better understood by reference to the following detailed description taken in conjunction with the accompanying drawings.

BRIEF DESCRIPTION OF THE DRAWINGS

FIG. 1 is a partially cut away perspective view of an internal mirror laser, showing the arrangement of cooling fins on the cathode, capillary tube and anode.

FIG. 2 is an elevated cross-sectional view of the anode portion of the internal mirror laser taken along line 2—2 of FIG. 1.

FIG. 3 is an elevated cross-sectional view of the capillary tube portion of the internal mirror laser taken along line 3—3 of FIG. 1.

FIG. 4 is an elevated cross-sectional view of the cathode portion of the internal mirror laser taken along line 4—4 of FIG. 1.

FIG. 5 is an elevated cross-sectional view of the internal mirror laser taken along line 5—5 of FIG. 1.

DETAILED DESCRIPTION OF A PREFERRED EMBODIMENT

The operation of CW argon-ion lasers is well-known and need not be described herein other than to note that a substantial amount of heat is generated which must be dissipated to avoid undue increases of temperature.

Referring now to FIG. 1, an internal mirror laser 10 according to the invention is shown in perspective view. Laser 10 includes cathode housing 12 with radially extending cooling fins 14 longitudinally attached thereto. Capillary tube 16 is constructed of beryllia or the like and carries radially extending longitudinally attached outer stage cooling fins 18a,b and inner stage cooling fins 19a,b and capillary tube thin cylinders 21a and 21b. Anode housing 20 carries radially extending longitudinally attached cooling fins 22 and anode fin cylinder 23. Laser mirrors 24 and 26 are attached to the cathode and anode housings, respectively. Aluminum cylinder 28a, 28b surrounds the internal mirror laser 10 along its longitudinal axis.

It has been found that materials can be assigned a thermal assymmetry figure of merit calculated from their thermal conductivity and thermal expansion. High thermal conductivity and low thermal expansion are desirable. This figure of merit can be expressed as the quotient of thermal conductivity (in watts per inch per degree C.) divided by thermal expansion (in inches per inch per degree C.). Representative materials are set forth below:

TABLE I

FIGURES OF MERIT FOR REPRESENTATIVE LASER MATERIALS

|  | Thermal Conductivity w/in/°c. | Thermal expansion in/in/°c. × 10<sup>−7</sup> | FIG. of merit w/in × 10<sup>6</sup> |
|---|---|---|---|
| Beryllia (BeO) | 5.0 | 65 | .769 |
| Copper | 10.0 | 169 | .592 |
| Beryllium | 3.5 | 116 | .302 |
| Invar | 0.26 | 9.0 | .289 |
| Aluminum | 5.3 | 236 | .225 |
| Alumina (Al$_2$O$_3$) | 0.7 | 65 | .108 |
| 1010 Steel | 1.3 | 126 | .103 |
| Kovar (NiFeCo alloy) | 0.42 | 59 | .071 |
| Fused Silica (SiO$_2$) | 0.036 | 5.6 | .064 |
| 4750 Alloy (NiFe alloy) | 0.4 | 75 | .053 |
| 304 Stainless Steel | 0.37 | 173 | .021 |
| 7740 Glass (Pyrex) | 0.033 | 32 | .010 |
| 7052 Glass | 0.03 | 47 | .006 |

Beryllia, because of its desirable thermal properties and its resistence to sputtering, is a preferably used material to form the laser bore and capillary tube. It is also an excellent choice for the cathode, anode and resonator support structure. However, it is a very expensive material. Therefore, it is desirable in practical, cost critical applications to minimize the use of beryllia. It is typically only used where absolutely necessary (i.e., to form the capillary tube). The remaining parts of the envelope and resonator support structure, namely the cathode and anode housings, are typically made of such materials as Kovar, which is a special ferrous alloy, fused silica or alumina. While such materials have favorable thermal expansion characteristics, they have poor heat dissipation characteristics. Therefore, any advantage in thermal expansion characteristics is likely to be offset by a restricted temperature operating range.

As Table I illustrates, copper has a figure of merit almost equal to beryllia and twice that of beryllium. It therefore would appear to be a good choice for the cathode and anode envelopes and resonator support structure. However, copper has a very low yield strength when annealed, which is a very undesirable property for a resonator support structure. For this reason, copper has been considered undesirable in this application except as an anode/anode envelope material. However, according to the invention, a laser plasma tube constructed of copper with a minimum wall thickness on the order of 0.125 inches provides sufficient strength to overcome the presumed inherent inadequacies of copper. In addition, a wall thickness on this order has also been found to achieve superior cooling and uniformity of thermal characteristics. It is believed this phenomenon is due to a low thermal impedance around the circumference of the envelope which minimizes thermal gradients and thus asymmetries and undesired distortions to the laser cavity.

In operation, cooling air enters cylinder 28a,b at both the anode and cathode ends of laser 10 through inlet ports 42 and 44. Cooling air is drawn across anode cooling fins 22 and capillary tube cooling fins 18b and 19b as well as from the other direction across cathode cooling fins 14 and capillary tube cooling fins 18a and 19a and is exhausted from the laser at outlet port 30. The airflow is intended to cool the cathode and anode housings uniformly in addition to the capillary tube disposed therebetween. Maximum cooling capacity is important, since the cathode and anode housings form a part of the resonator support structure and therefore affect mechanical alignment under various temperature conditions.

FIG. 2 shows a cross-sectional view of the anode portion of laser 10. Anode housing 20 is shown with its radially extending cooling fins 22 and anode fin cylinder 23 attached thereto. The anode housing 20, the cooling fins 22 and fin cylinder 23 are copper. Cylinder 28b coaxially surrounds the anode portion of the laser and is typically aluminum.

FIG. 3 is a cross-sectional view of the capillary tube portion of the internal mirror laser. Capillary tube 16 form main bore 32 and gas return channels 34. Radially extending cooling fins 19a extend between tube 16 and fin cylinder 21a, while fins 18a extend between the fin and the coaxial aluminum cylinder 28a. The aluminum cylinder 28a circumferentially encloses the structure and ducts cooling flow. It need not be part of the conductive heat dissipation mechanism.

FIG. 4 is cross-sectional view of the cathode portion of laser 10. Cathode housing 12 is of annealed copper according to the invention. Radially extending cooling fins constructed of copper 14 are attached thereto. The cooling fins 14 extend to the aluminum cylinder 28a coaxially surround the entire structure.

FIG. 5 is a cross-sectional view of the laser taken along line 5—5 of FIG. 1. In this view, copper cathode housing 12 and copper anode housing 20 are shown with their respective cooling fins 14 and 22. This view also illustrates the relative massiveness of cathode wall 36. In addition, massive copper plates 38 and 40 are shown on the ends of the cathode and anode envelope, respectively. The copper plates 38 and 40 which are thick, massive and heat conductive, support the respective mirrors 24 and 26 with mechanical and thermal stability. A thickness of 0.10 inches is considered sufficient. The outlet port 30 may be channeled into a single exhaust conduit 46 as shown in FIG. 5.

In the preferred embodiment, cooling air is circulated in at inlet ports 42 and 44 and is drawn out of the laser 10 at outlet port 30. Axial cooling in this manner minimizes thermal asymmetries throughout the laser structure.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention, which is defined by the appended claims.

What is claimed as invention is:

1. An internal mirror gas laser having a capillary tube and an anode housing coaxial with a central axis, and having mirrors sealably mounted to each end of said laser, said mirrors being in alignment about said central axis, said laser further comprising:
   a cathode housing forming a supporting wall coaxial with said central axis, said cathode housing being constructed primarily of a material with a figure of merit (defined as the quotient of thermal conductivity divided by thermal expansion) greater than $0.3 \times 10^6$ watts per inch, one of said mirrors being sealably mounted to said cathode housing, said figure of merit being sufficient to ensure that said cathode housing provides a combination of thermal stability and uniform heat dissipation which is adequate to prevent misalignment of said mirrors under conditions of convective cooling; and
   means for convectively cooling said cathode housing, said anode housing and said capillary tube with minimal thermal assymmetry relative to said central axis.

2. The laser according to claim 1 wherein said cathode housing is constructed of cooper and has a wall thickness of at least 0.1 inch.

3. The laser according to claims 1 or 2 wherein said means for convectively cooling comprise cooling fins in thermal communication with said cathode housing and extending radially from and attached longitudinally to said cathode housing, for directing flow of a cooling fluid coaxial with said central axis along at least a portion of said cathode housing.

4. The laser according to claim 3 wherein said cathode housing has a wall thickness of at least 0.125 inches.

5. The laser according to claim 3 wherein said cooling fins comprise a first inner stage coaxial with said central axis, at least one cylinder coaxial with said central axis and at least one outer stage coaxial with said central axis, said at least one cylinder forming a thermally conductive joint between said first inner stage and said at least one outer stage.

6. The laser according to claim 1 wherein said cathode housing is constructed of a material having a figure of merit of at least $0.3 \times 10^6$ watts per inch and a thermal conductivity of at least 5 watts per inch per degree celsius.

7. The laser according to claims 1 or 2 wherein copper end plates enclose ends of said cathode housing and of said anode housing and support said mirrors, said copper plates being of sufficient mass and thickness to provide mechanically and thermally stable support to said mirrors.

8. The laser according to claim 7 wherein said copper end plates are at least 0.10 inches thick.

* * * * *